(12) United States Patent
Avent et al.

(10) Patent No.: US 8,944,911 B2
(45) Date of Patent: Feb. 3, 2015

(54) ONLINE PARALLEL PLAY

(75) Inventors: Jason Avent, Hove (GB); Jonathan Gibson, Hayward Heath (GB); Chris Bowles, Hove (GB); James Callin, Brighton (GB); David Jefferies, Hove (GB)

(73) Assignee: Disney Enterprises, Inc., Burbank, CA (US)

( * ) Notice: Subject to any disclaimer, the term of this patent is extended or adjusted under 35 U.S.C. 154(b) by 509 days.

(21) Appl. No.: 12/844,740

(22) Filed: Jul. 27, 2010

(65) Prior Publication Data
US 2012/0028700 A1 Feb. 2, 2012

(51) Int. Cl.
*A63F 9/24* (2006.01)
*A63F 13/30* (2014.01)
*A63F 13/40* (2014.01)

(52) U.S. Cl.
CPC .............. *A63F 13/12* (2013.01); *A63F 13/10* (2013.01); *A63F 2300/5553* (2013.01); *A63F 2300/8082* (2013.01)
USPC .................................. 463/31; 463/35; 463/42

(58) Field of Classification Search
CPC . A63F 13/10; A63F 13/12; A63F 2300/8088; A63F 2300/572; A63F 13/00; A63F 13/06; A63F 2300/303; A63F 2300/305; A63F 2300/407; A63F 2300/5533; A63F 2300/5553; A63F 2300/5573; A63F 2300/807; A63F 2300/307; A63F 2300/404
USPC ................................................ 463/31, 35, 42
See application file for complete search history.

(56) References Cited

U.S. PATENT DOCUMENTS

| | | | |
|---|---|---|---|
| 7,497,776 B1 * | 3/2009 | Roman | 463/6 |
| 2003/0190940 A1 * | 10/2003 | Gordon et al. | 463/9 |
| 2004/0255032 A1 * | 12/2004 | Danieli | 709/229 |
| 2005/0059491 A1 * | 3/2005 | Oh | 463/42 |
| 2008/0318687 A1 * | 12/2008 | Backer et al. | 463/42 |
| 2010/0056236 A1 * | 3/2010 | Rhyne et al. | 463/1 |
| 2010/0227669 A1 * | 9/2010 | Van Luchene | 463/23 |
| 2011/0092282 A1 * | 4/2011 | Gary | 463/31 |
| 2011/0118033 A1 * | 5/2011 | Fiedler | 463/42 |
| 2011/0190062 A1 * | 8/2011 | Lee | 463/42 |
| 2011/0281648 A1 * | 11/2011 | Weising | 463/32 |

* cited by examiner

*Primary Examiner* — Steve Rowland
(74) *Attorney, Agent, or Firm* — Patterson + Sheridan, LLP

(57) ABSTRACT

Systems, methods and articles of manufacture are disclosed for providing concurrent gameplay of a single-player mode of a computer game. In one embodiment, a first instance of the single-player mode of the computer game is being played by a first player and receives, from a second instance of the single-player mode of the computer game, data associated with an avatar controlled by a second player. The first instance may provide, to the first player, an indication of the avatar controlled by the second player, as both players play the computer game.

27 Claims, 10 Drawing Sheets

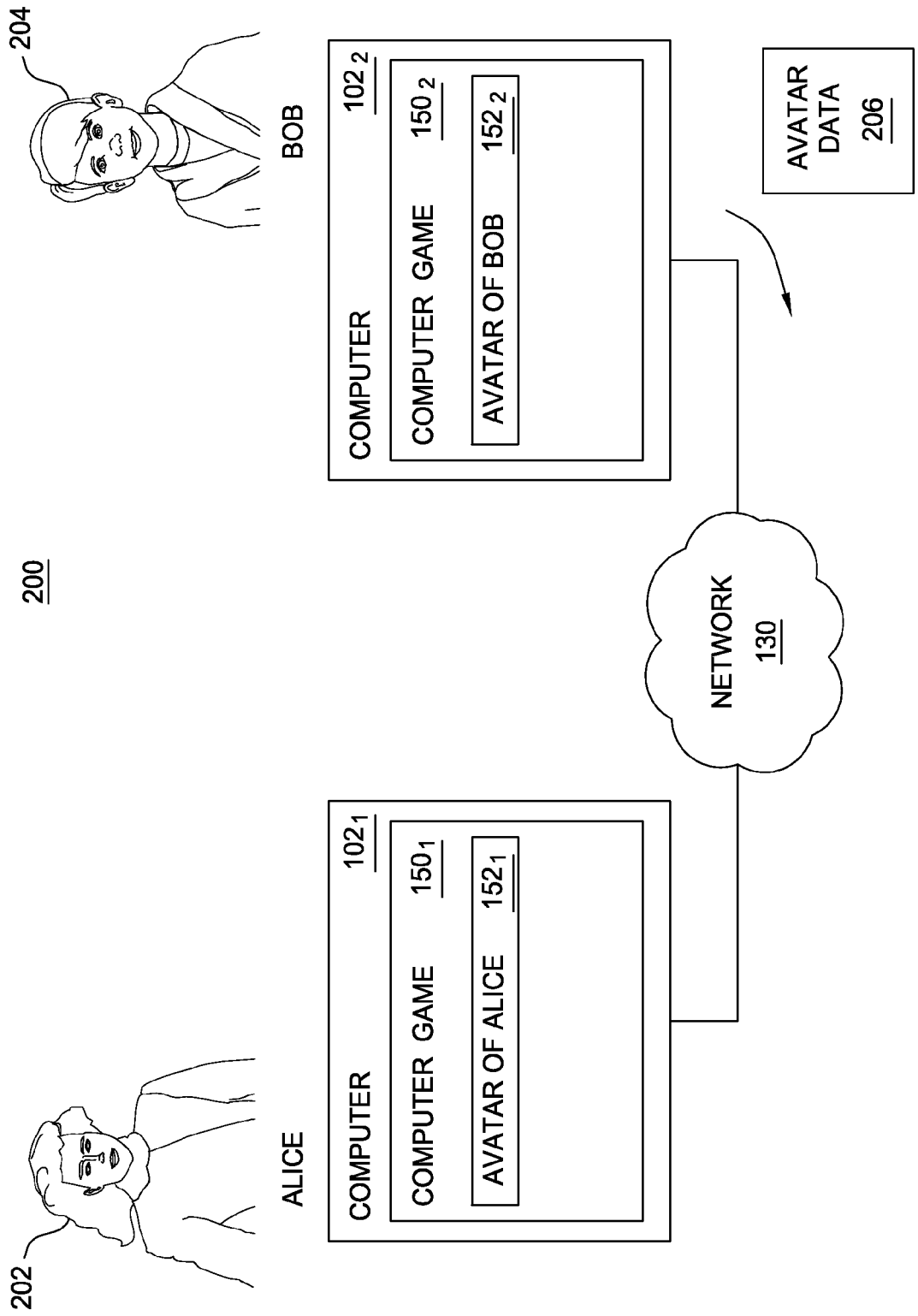

ONLINE PARALLEL PLAY

BACKGROUND

1. Field

Embodiments of the invention relate generally to computer games and, more particularly, to multi-session gaming in a single-player mode of a computer game.

2. Description of the Related Art

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters, racecars, or other features of the game.

Generally, the designer of the computer game will create a computer-rendered world in which the computer game characters, racecars, or other features may interact. For example, many computer games allow a player to maneuver an avatar (e.g., a sprite or character) through a computer-rendered world to accomplish a set of tasks. Other computer games allow the player to control a vehicle or airplane through a computer-rendered world. In two-dimensional computer games, characters may move in two dimensions (e.g., up and down on the screen or left and right), while in three-dimensional computer games, characters are typically allowed to move in three dimensions in the computer-rendered world.

SUMMARY

One embodiment of the invention provides a method that generally includes providing a first instance of a single-player mode of a computer game, wherein the first instance includes a first avatar being controlled by a first player. The method may also include receiving, from a second instance of the single-player mode of the computer game, data associated with a second avatar being controlled by a second player concurrently with the first avatar being controlled by the first player; and generating an indication of the second avatar in the first instance of the single-player mode of the computer game, based on the data associated with the second avatar, whereby concurrent activity of the second avatar in the second instance is conveyed to the first player of the first instance.

Another embodiment of the invention provides a computer-readable storage medium containing a program which, when executed, performs an operation. The operation may generally include providing a first instance of a single-player mode of a computer game, wherein the first instance includes a first avatar being controlled by a first player; receiving, from a second instance of the single-player mode of the computer game, data associated with a second avatar being controlled by a second player concurrently with the first avatar being controlled by the first player; and generating an indication of the second avatar in the first instance of the single-player mode of the computer game, based on the data associated with the second avatar, whereby concurrent activity of the second avatar in the second instance is conveyed to the first player of the first instance.

Yet another embodiment of the invention provides a system that includes one or more computer processors and a memory containing a program which, when executed by the one or more computer processors, is configured to perform an operation. The operation may generally include providing a first instance of a single-player mode of a computer game, wherein the first instance includes a first avatar being controlled by a first player; receiving, from a second instance of the single-player mode of the computer game, data associated with a second avatar being controlled by a second player concurrently with the first avatar being controlled by the first player; and generating an indication of the second avatar in the first instance of the single-player mode of the computer game, based on the data associated with the second avatar, whereby concurrent activity of the second avatar in the second instance is conveyed to the first player of the first instance.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2C are block diagrams illustrating a networked system for providing the multi-session gaming experience in the single-player mode of a computer game, according to one embodiment of the invention.

DETAILED DESCRIPTION OF THE PREFERRED EMBODIMENTS

Figure 1:
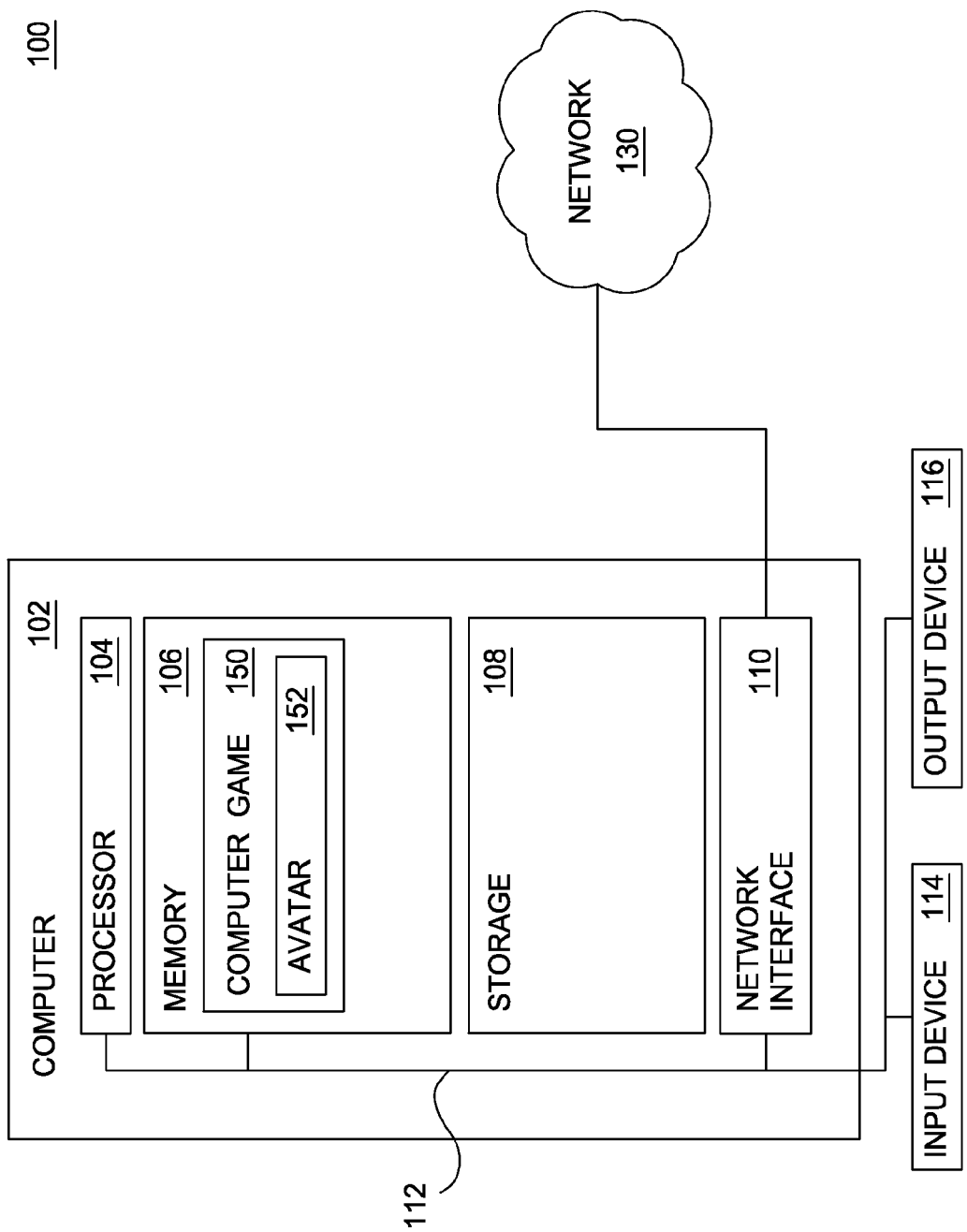
FIG. 1 is a block diagram illustrating a system for providing a multi-session gaming experience in a single-player mode of a computer game, according to one embodiment of the invention.

Embodiments of the invention generally provide a multi-session gaming experience in a single-player mode of a computer game. One embodiment of the invention configures the single-player mode of the computer game to coordinate between multiple instances of the computer game. Each instance of the computer game may include an avatar being controlled by a different player. Each instance of the computer game may also output indications of avatars controlled by other players. The avatars may be controlled by other players concurrently with a first avatar being controlled by a first player. In one embodiment, an indication of an avatar may include an appearance and a position of the avatar in the game environment. Advantageously, a first player of the computer game may be notified of game progress of another player of the computer game. The first player may also be notified of annotations in the game environment, made by another player (e.g., to provide a tip or a hint related to the computer game).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for providing a multi-session gaming experience in a single-player mode of a computer game, according to one embodiment of the invention. The system 100 includes a computer 102. The computer 102 may be connected to other computers via a network 130. The computer 102 and the other computers may constitute a distributed system. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game program) or related data available in the cloud. For example, the computer game described herein could execute on a computing system in the cloud, thereby allowing users to access the game from any computing system attached to a network connected to the cloud (e.g., the Internet).

As shown, the memory 106 of the computer 102 includes a computer game 150. As described above, in one embodiment, the computer game may include the single-player mode that is configured to coordinate between multiple instances of the computer game. In one embodiment, computer games may include games of one or more of the following genres: action, adventure, arcade, role-playing, simulation, sports, racing, fighting, shooting, shooter, strategy, and puzzle. In an alternative embodiment, the computer game is a non-racing game—i.e., the computer game does not belong to the racing genre of games, but may belong to one or more other genres of games. In one embodiment, the racing genre of computer games refers to any game for which the primary game objective is to race along a race course, either against the clock or against other computer- or player-controlled characters. The racing may occur over land, sea, and/or air, and may involve appropriate vehicles. Further, the racing may occur from a first- or third-person perspective for the player.

Further, each instance of the computer game 150 may include an avatar 152 being controlled by a different player. In one embodiment, an avatar refers to any visual object in the computer game which movement and/or actions may be controlled directly by a player (instead of indirectly through controlling another visual object in the computer game). For example, the avatar may be a player character, a player vehicle, or any other character or object which role the player assumes over a course of playing the computer game (e.g., a monster or a villain).

Figure 2B:
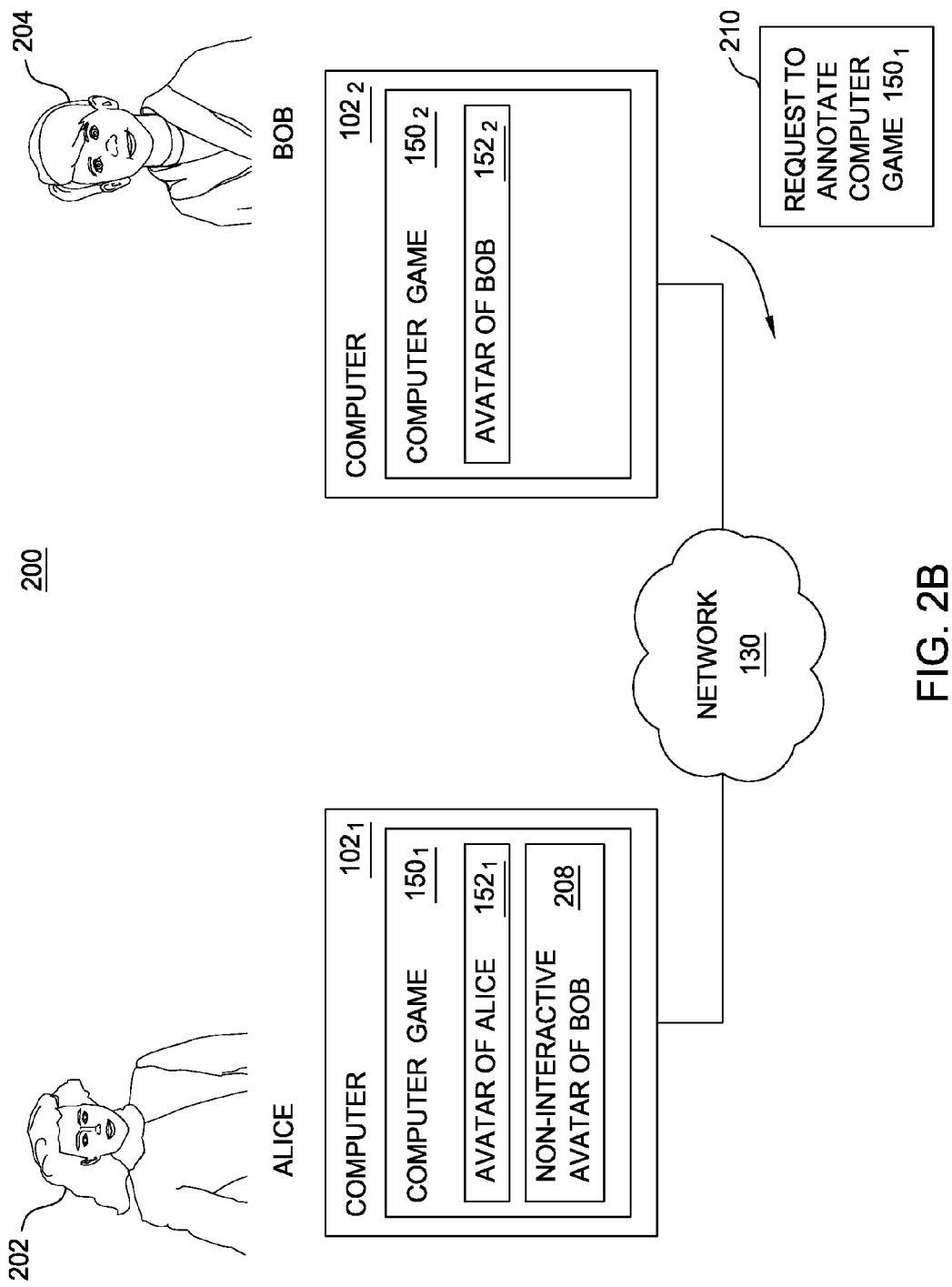
Figure 2C:
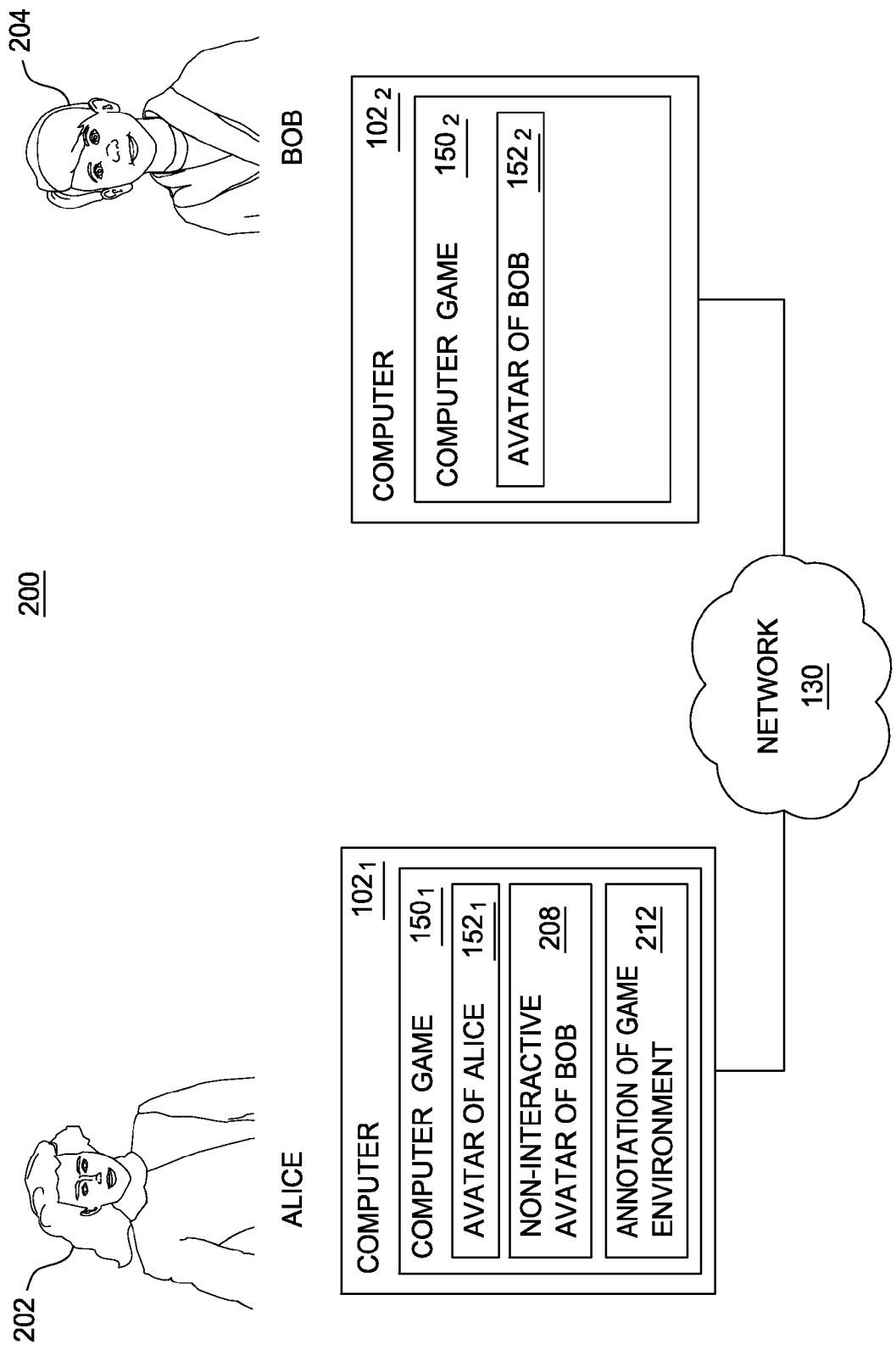

To illustrate embodiments of the invention, reference is now made to FIGS. 2A-2C, which are block diagrams illustrating a networked system 200 for providing the multi-session gaming experience in the single-player mode of the computer game, according to one embodiment of the invention.

Referring first to FIG. 2A, assume that a first player, Alice 202, is controlling a first avatar $152_1$ in a first instance $150_1$ of the computer game 150. Further, assume that a second player, Bob 204, is controlling a second avatar $152_2$ in a second instance $150_2$ of the computer game 150—concurrently with Alice 202 controlling the first avatar $152_1$ in the first instance $150_1$ of the computer game 150. In one embodiment, each instance $150_1$, $150_2$ represents a separate execution of the computer game that includes game state specific to the respective separate execution and that corresponds to a separate (virtual) parallel universe of a game environment provided by the computer game. The game state of each instance $150_1$, $150_2$ may differ with one another, based on different player inputs and/or nondeterministic factors introduced by the computer game (e.g., a random power-up awarded to the player at the completion of each level).

As shown, the instances $150_1$, $150_2$ of the computer game execute on different computers $102_1$, $102_2$ that communicate with each other over the network 130. While embodiments are described herein with reference to instances of the computer game that communicate directly with one another (e.g., in a peer-to-peer arrangement), other embodiments are broadly contemplated. For example, in an alternative embodiment, the instances of the computer game may be client instances that communicate over the network 130 with a server application executing on a third computer, to initiate and/or execute concurrent play of the computer game 150.

Assume that Alice 202 and Bob 204 desire to participate in concurrent play of the single-player mode of the computer game 150 with each other. In one embodiment, a single-player mode of a computer game supports concurrent play by no more than one player. Depending on the embodiment, the computer game may also include one or more multiplayer modes. Multiplayer modes may include an alternating multi-player mode and a concurrent (e.g., simultaneous) multi-player mode. An alternating multiplayer mode is a mode in which players take turns playing game content from the single-player mode—i.e., the players play alternately rather than concurrently. A single-player game refers to a computer game that does not include any simultaneous multiplayer mode. Depending on the embodiment, a single-player game may also include no alternating multiplayer mode.

In another embodiment, a single-player mode also includes a game mode in which one player assumes a main role in the computer game while one or more additional players assume concurrent, but decidedly less significant roles in the computer game. For example, suppose that the computer game is an action game in which a single player hunts ducks. Suppose also that, as a hidden feature, a second player may control movement of the ducks. That is, the second player is relegated to a minor role of controlling movement of ducks, relative to the single player who achieves objectives of the computer game (advancing through rounds of the computer game). In this particular example, because the computer game does not support two players assuming roles of comparable or corresponding significance in the computer game, the computer game is considered to be a single-player game, rather than a multiplayer game.

As a further example, suppose that the computer game is an immersive role-playing game for a single player. Suppose also that, as an added feature, the first player may configure one or more role-playing characters to be controlled—only during battles—by a second player. The second player may not, however, control any of the role-playing characters in fields, in towns, in dungeons, during cutscenes, etc. In other words, the second player is relegated to a minor role of controlling one more characters in battle, relative to the single player who achieves the objectives of the computer game (i.e. role-playing through the story of the computer game). In this particular example, because the computer game does not support two players assuming roles of comparable or corresponding significance in the computer game, the computer game is considered to be a single-player game, rather than a multiplayer game.

In one embodiment, Alice 202 and Bob 204 may, in various ways, initiate concurrent play of the single-player mode of the computer game 150 with each other. For example, both Alice 202 and Bob 204 may select, from a main menu of the computer game 150, a single-player mode for concurrent play with a friend (e.g., "Single Player—Concurrent with a Friend"). Alice 202 and Bob 204 may then enter a game lobby and invite one another to initiate concurrent play of the single-player mode of the computer game 150. In one embodiment, the game lobby provides an interface for Alice 202 and Bob 204 to participate in text and/or voice chat and to initiate the concurrent play of the single-player mode of the computer game 150.

In an alternative embodiment, Alice 202 may send Bob 204 (via the computer game 150) an invitation to join a concurrent play of the single-player mode of the computer game 150, which Bob receives while playing the computer game 150 (or another computer game). If Bob 204 accepts the invitation from Alice 202, the current gameplay session of Bob may be discontinued or suspended to be resumed at a later time.

In yet another embodiment, Alice 202 may invite Bob 204 to a concurrent gameplay of a portion of the computer game 150. For example, Alice 202, having reached the final level of the computer game 150, may invite Bob 204 to concurrently play the final level. Advantageously, Bob 204 may begin concurrently playing on the final level of the computer game 150, without having to complete the previous levels of the computer game 150.

Assume that Alice 202 and Bob 204 have initiated a concurrent play of the single-player mode of the computer game with each other. In this mode, the players (Alice and Bob) will experience the game play as though they were the only non-CPU (i.e., human) player in their respective game instances. Thus, the first instance $150_1$ of the computer game 150 will not recognize Bob as an active player and, vice versa, the second instance $150_2$ of the computer game 150 will not recognize Alice as an active player. However, each game instance will include a non-interactive instantiation of the other player's avatar that will be visible to the active player in that instance.

To this end, first instance $150_1$ of the computer game may receive avatar data 206 from the second instance $150_2$ of the computer game. The avatar data 206 may include any data associated with the avatar $152_2$ of Bob in the second instance $150_2$ of the computer game—such as an appearance of the avatar $152_2$, a size of the avatar $152_2$, a posture of the avatar $152_2$, a position of the avatar $152_2$, a velocity of the avatar $152_2$, an acceleration of the avatar $152_2$, etc. In one embodiment, the avatar data 206 may include sufficient information (e.g., position and appearance) for the first instance $150_1$ of the computer game to output a non-interactive version of the avatar $152_2$ in the first instance $150_1$ of the computer game. For example, as shown in FIG. 2B, the first instance $150_1$ of the computer game may output a non-interactive avatar 208 of Bob 204, based on the avatar data 206 received from the second instance $150_2$ of the computer game.

As used herein, a non-interactive avatar in an instance of a computer game refers to an avatar that does not interact with dynamic elements (e.g., objects) in the instance of the computer game—but instead interacts with dynamic elements in a different instance of the computer game. A dynamic element refers to an element in the game that may undergo a visual change or that may alter an outcome of the gameplay, as a result of actions taken by an avatar in the game. For example, dynamic elements may include objects movable by the avatar and portions of the environment that may be altered by the avatar (e.g., smashing a wall, digging a hole, chopping a tree, constructing a bridge, or splashing water).

Referring again to FIG. 2B, although the non-interactive avatar 208 of Bob is output in the first instance $150_1$ of the computer game, the non-interactive avatar does not—at least from the perspective of Alice 202—interact with (any dynamic elements of) the first instance $150_1$ of the computer game. Instead, Alice 202 sees the non-interactive avatar 208 of Bob in the first instance $150_1$ of the computer game, as the non-interactive avatar 208 interacts with the second instance $150_1$ of the computer game (based on input from Bob 204).

In one embodiment, the non-interactive avatar 208 of Bob is output at a position in the first instance $150_1$ of the computer game that corresponds to a position of the avatar $152_2$ of Bob in the second instance $150_2$ of the computer game. The first instance $150_1$ may also update, frame by frame, the position of the non-interactive avatar 208 of Bob—as the avatar $152_2$ of Bob navigates the second instance $150_2$ of the computer game. In this regard, the first instance $150_1$ of the computer game may render the non-interactive avatar 208 of Bob as a dynamic object in the first instance $150_1$ and based on the received avatar data 206. Further, because the non-interactive avatar 208 cannot interact with the game environment of the first instance $150_1$, the first instance $150_1$ bypasses any collision tests between the non-interactive avatar 208 and any other dynamic object in the first instance $150_1$.

Accordingly, in one embodiment, updates to the non-interactive avatar 208 (e.g., progress, position, velocity, acceleration, size, appearance, etc.) are determined from the inputs of Bob to the second instance $150_2$ of the computer game for controlling the second avatar $152_2$. In an alternative embodiment, the second instance $150_2$ of the computer game may process the inputs of Bob and send to the first instance $150_1$ data specifying an absolute position (frame-by-frame) of the avatar $152_2$ of Bob in the second instance $150_2$. Updates to the non-interactive avatar may also be, at least in part, determined by inputs of Alice for customizing the appearance of the non-interactive avatar 208 of Bob in the first instance $150_1$ of the computer game. For example, Alice may customize visual characteristics of the non-interactive avatar 208, such as size and/or translucency.

Advantageously, the first instance $150_1$ of the computer game may convey to Alice 202 a concurrent progress of the avatar $152_2$ of Bob relative to the avatar $152_1$ of Alice in the computer game 150—and vice versa. Conveying to Alice 202 a concurrent progress of the avatar 152 of Bob is further described below in conjunction with FIGS. 3A-3B. Consequently, Alice and Bob may concurrently experience a single-player mode of the computer game 150. In particular, Alice may play the single-player mode of the computer game 150 (the first instance $150_1$)—while acquiring a glimpse into a parallel universe of the game environment (the second instance $150_2$), corresponding to a concurrent play-through of the computer game 150 by Bob. Alice and Bob may compete to see who can finish the computer game 150 more quickly, collaborate to see who can find hidden secrets in the computer game 150, etc.

In some cases, outputting the non-interactive avatar 208 of Bob to appear identical to the avatar $152_2$ of Bob may lead to user confusion—especially given that the non-interactive avatar 208 of Bob does not interact with dynamic elements of the game environment, as previously described. In one embodiment, the first instance $150_1$ of the computer game may output the non-interactive avatar 208 of Bob to have visual characteristics suggestive of this non-interactive property. For instance, in some embodiments, the non-interactive avatar 208 of Bob may be silhouette or outline of the avatar $152_2$ of Bob. In other embodiments, the non-interactive avatar 208 may be a black-and-white, grayscale, duotone, or translucent version of the avatar $152_2$ of Bob. In still other embodiments, the non-interactive avatar 208 of Bob may be an icon, marker, or symbol that may not necessarily bear any visual resemblance to the avatar $152_2$ of Bob. In yet other embodiments, the non-interactive avatar 208 of Bob may appear identical to the avatar $152_2$ of Bob and include a marker atop the non-interactive avatar 208 (e.g., a letter "G" for "ghost").

While embodiments are described herein with reference to visually conveying to Alice a concurrent activity and/or progress of Bob, other embodiments are broadly contemplated. For example, in one embodiment, the first instance $150_1$ of the computer game may aurally or tactilely convey to Alice the concurrent activity and/or progress of Bob. For instance, the first instance $150_1$ of the computer game may vocalize to Alice (e.g., using a digitized or synthesized voiceover), "Bob is three screens behind you". The first instance $150_1$ of the computer game may also use haptic or tactile feedback and cause a game controller used by Alice to vibrate according to the number of screens by which Bob trails Alice in the respective instances of the computer game, for example.

In one embodiment, in addition to seeing the non-interactive avatar 208 of Bob, Alice may also see annotations to the game environment made by Bob. Referring again to FIG. 2B, Bob 204 may specify to annotate the first instance $150_1$ of the computer game. Accordingly, the first instance $150_1$ of the computer game may receive, from the second instance $150_2$ of the computer game, a request 210 to annotate the first instance $150_1$ of the computer game. The request 210 may include descriptive text for the annotation, a position in the game environment of the first instance $150_1$ for the annotation, a shape, symbol, or design of the annotation, etc. Referring now to FIG. 2C, the first instance $150_1$ of the computer game may output an annotation 212 in response to the request 210. Advantageously, Alice and Bob may more conveniently share game hints, tips, tricks, etc. while engaging in concurrent play of the single-player mode of the computer game, thereby making the concurrent play a richer experience for Alice and Bob.

To further illustrate embodiments of the invention, FIGS. 3A-5 provide exemplary graphical user interface (GUI) screens as seen by Alice and/or Bob, according to one embodiment of the invention. The GUI screens may be generated by the computer game 150 of FIG. 1. Although embodiments herein are described with reference to a 2D computer game, those skilled in the art will recognize that the techniques herein may be applied to 3D (and other) computer games.

Figure 3A:
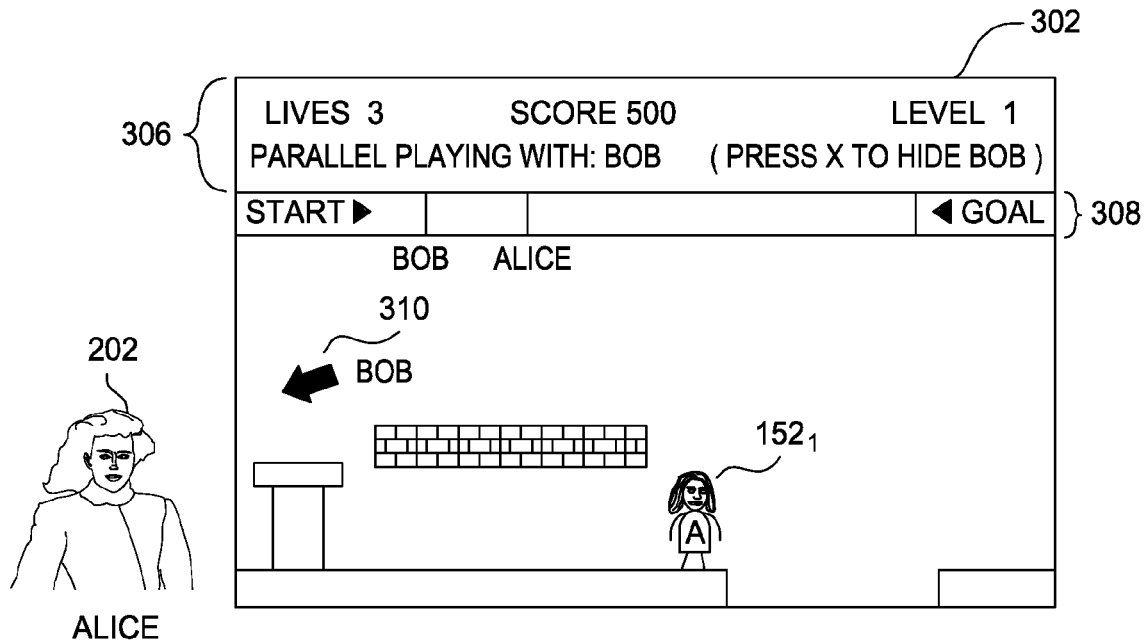
FIGS. 3A-3B illustrate exemplary GUI screens output by the networked system and as seen by a first player of the computer game, according to one embodiment of the invention.
Figure 3B:
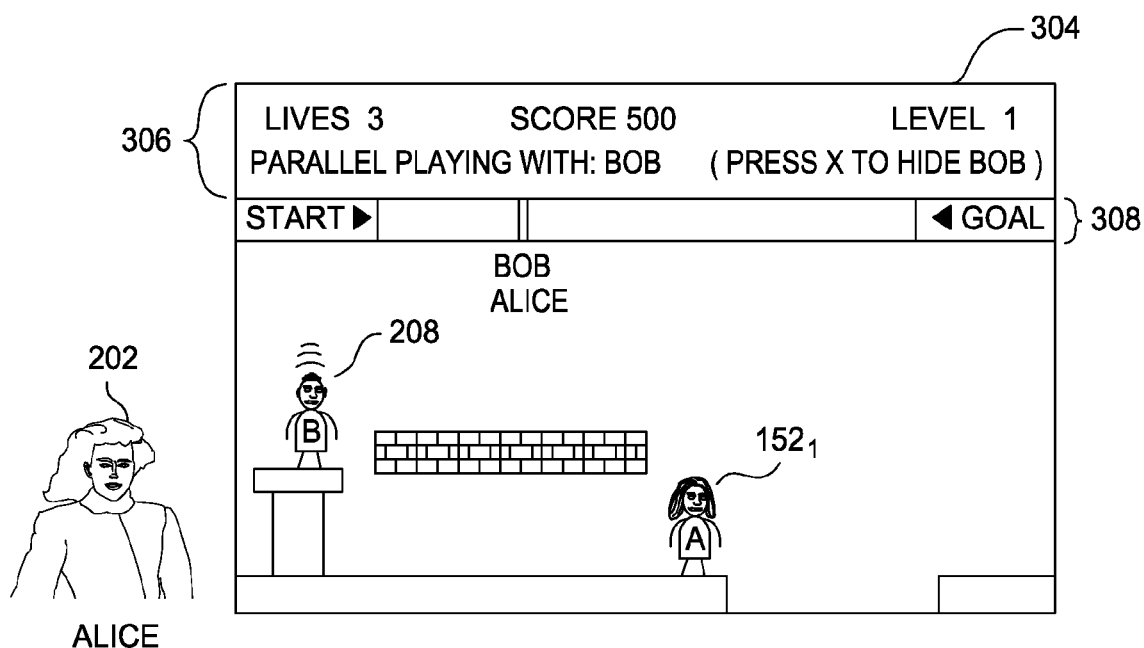

FIGS. 3A-3B illustrate exemplary GUI screens 302, 304 as seen by Alice 202, according to one embodiment of the invention. As shown, the GUI screen 302 includes the avatar $152_1$ of Alice. The GUI screen 302 may also include gameplay information 306. The gameplay information 306 may include an indication that Alice is currently participating in a concurrent play of the computer game with Bob. The gameplay information 306 may also indicate that Alice may specify whether the non-interactive avatar 208 of Bob is displayed via a toggle (e.g., button X). In response to the toggle, the computer game 150 may selectively output or cease to output the non-interactive avatar 208 of Bob for display on the GUI screen 302.

In one embodiment, the GUI screen 302 also includes a progress meter 308. The progress meter 308 indicates the position of the avatar $152_1$ of Alice relative to boundaries of the game environment. The progress meter 308 may also indicate the position of the non-interactive avatar 208 of Bob in a similar manner.

In one embodiment, the first instance $150_1$ of the computer game may determine that the non-interactive avatar 208 of Bob is off-screen—i.e., the non-interactive avatar 208 of Bob is not visible in the GUI screen 302 due to being currently positioned outside of (the portion of the game environment, that is depicted in) the GUI screen 302. Rather than not outputting the non-interactive avatar 208 of Bob in the GUI screen 302, the first instance $150_1$ of the computer game may output an indication 302 of the current position of the non-interactive avatar 208 of Bob, relative to the GUI screen 302. As shown, the indication 310 conveys to Alice that Bob is currently to the left of the GUI screen 302. In one embodiment, the first instance $150_1$ of the computer game may alter the appearance of the indication 310 based on the relative distance between the non-interactive avatar 208 of Bob and the GUI screen 302. For example, the indication 310 may be enlarged as the non-interactive avatar 208 of Bob moves nearer toward the GUI screen 302.

In one embodiment, when the non-interactive avatar 208 of Bob is off-screen, the first instance $150_1$ of the computer game may also output a picture-in-picture GUI screen. The picture-in-picture GUI screen may overlay the GUI screen 302 seen by Alice, with a smaller version of a GUI screen seen by Bob. For example, the picture-in-picture GUI screen may overlay a top left corner of a 1024×768 GUI screen seen by Alice (and measured in pixels) with a 256×192 version of the GUI screen seen by Bob. Depending on the embodiment, the smaller version of the GUI screen seen by Bob may represent the entire GUI screen seen by Bob or a cropped portion of the screen (e.g., a cropped portion surrounding the avatar $152_2$ of Bob). Further, the smaller version of the GUI screen seen by Bob may be updated at a lower frame rate (e.g., 12 frames per second) relative to the GUI screen seen by Alice (e.g., 30 frames per second). Further, Alice and/or Bob may configure the shape, size, frame rate, position, etc. of the picture-in-picture GUI, prior to or during concurrent gameplay of the computer game 150. Accordingly, the concurrent gameplay experience of Alice and Bob may be enhanced, even when Alice and Bob are not on the same screen in the computer game.

In one embodiment, the first instance $150_1$ of the computer game may determine that the non-interactive avatar 208 of Bob is no longer off-screen. Referring now to FIG. 3B, the first instance $150_1$ of the computer game may output the non-interactive avatar 208 of Bob in the GUI screen 304—instead of outputting the indication 310 of the position of the non-interactive avatar 208 of Bob, relative to the GUI screen 304 and/or outputting the picture-in-picture GUI screen. For sake of simplicity, the non-interactive avatar 208 of Bob is shown to be visually identical to the avatar $152_2$ of Bob—although, as described above, it may be desirable to visually distinguish the non-interactive avatar 208 from the avatar $152_2$ in other embodiments. In this particular example, the GUI screen 304 conveys to Alice that Bob is taking a hidden passage in the game environment (i.e., entering a pipe). Advantageously, Alice and Bob may use movement of the non-interactive avatars through the game environment to share game hints while concurrently playing the single-player mode of the computer game 150.

In one embodiment, if the first instance $150_1$ of the computer game determines that the non-interactive avatar 208 of Bob is no longer off-screen, the first instance $150_1$ of the computer game may output the non-interactive avatar 208 of Bob in the GUI screen 304—in addition to outputting objects that the avatar $152_2$ of Bob is interacting with in the second instance $150_2$ and/or objects in the vicinity of the avatar 1522 of Bob in the second instance $150_2$. These objects may be output in the GUI screen 304 to have visual characteristics to suggest to Alice that these objects exist in the second instance $150_2$ being played by Bob and not the first instance $150_1$ being played by Alice (e.g., silhouettes or outlines of the objects). In one embodiment, objects within a sphere of a specified radius (or any other shape) surrounding the avatar $152_2$ of Bob may be output on the GUI screen 304 for Alice. Depending on the embodiment, the specified radius and/or the shape may be configured by Alice and/or by Bob prior to or during concurrent gameplay of the computer game 150.

In one embodiment, rather than outputting the non-interactive avatar 208 of Bob in the GUI screen 304, the first instance $150_1$ of the computer game may output visual cues that convey, in the first instance $150_1$ of the computer game, the concurrent activity of the avatar $152_2$ of Bob in the second instance $150_2$ of the computer game. In one embodiment, the visual cues may include an artifact or change in the game environment of the first instance $150_1$ of the computer game, responsive to actions taken by the avatar $152_2$ of Bob in the second instance $150_2$ of the computer game. For example, the visual cues may include footsteps in a path taken by the avatar $152_2$ of Bob (without outputting the corresponding non-interactive avatar 208 of Bob in the GUI screen 304). As a further example, if the avatar $152_2$ of Bob discovers a hidden treasure chest in the second instance $150_2$, the corresponding hidden treasure chest may begin to glow in the GUI screen 304 for the first instance $150_1$. Put another way, the first instance $150_1$ may not necessarily always need to output the non-interactive avatar 208 of Bob in order to convey to Alice the concurrent activity of Bob in the second instance $150_2$ of the computer game; instead, the first instance $150_1$ may output visual cues to that effect.

Figure 4A:
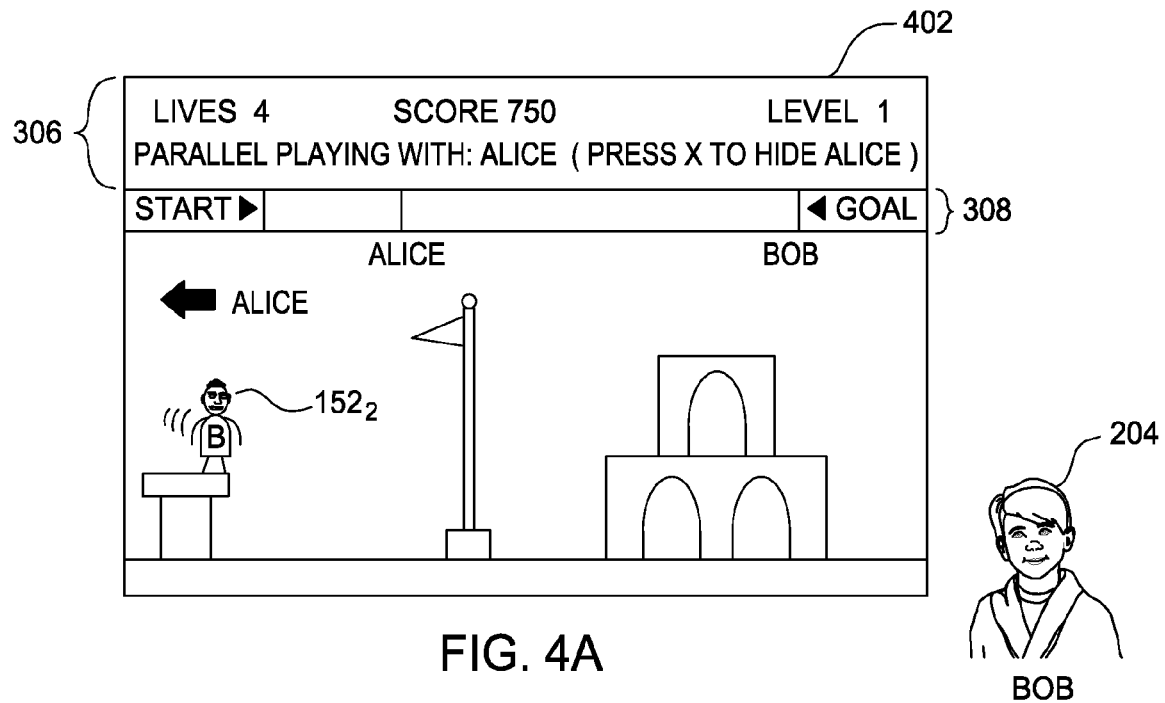
FIGS. 4A-4B illustrate exemplary GUI screens output by the networked system and as seen by a second player of the computer game, according to one embodiment of the invention.
Figure 4B:
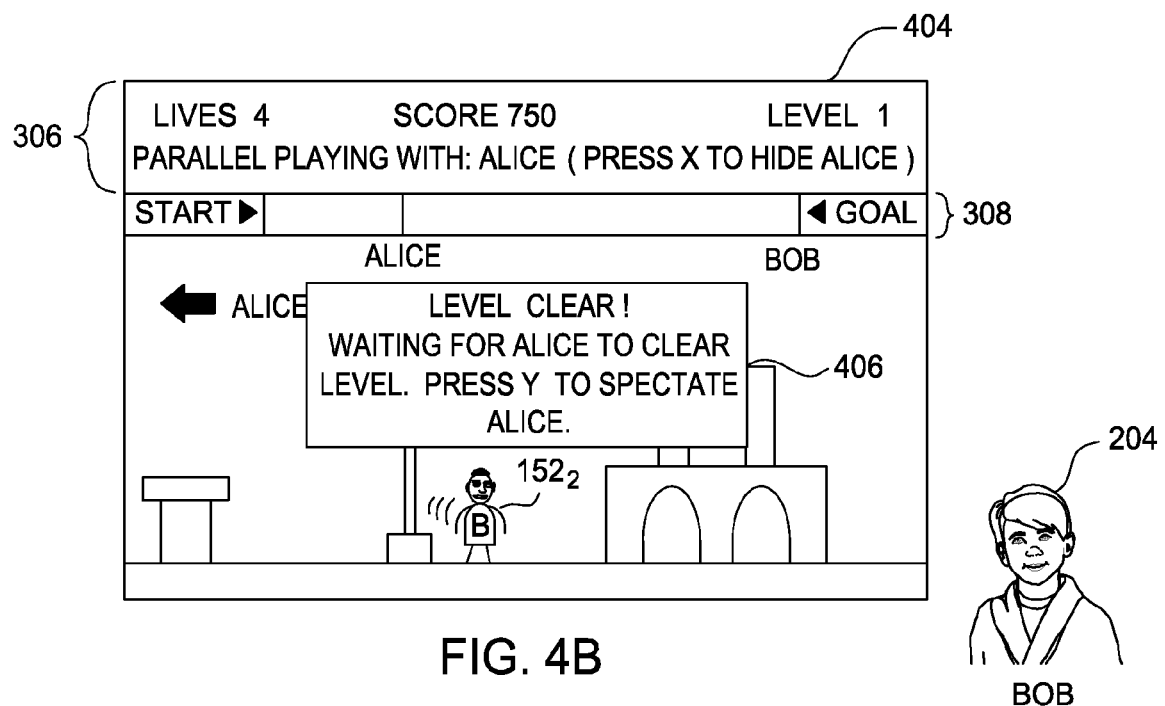

FIGS. 4A-4B illustrate exemplary GUI screens 402, 404 as seen by Bob 204, according to one embodiment of the invention. As shown in FIG. 4A, the GUI screen 402 includes the avatar $152_2$ of Bob. In this particular example, Bob—who just took a hidden passage in the game environment—finds himself at the end of the current level in the computer game 150. The progress meter 308, which shows Alice being far behind Bob in progress in the current level, suggests that Bob has discovered a shortcut in the current level. However, Alice and Bob may desire that they do not stray too far from each other in terms of game progress, as straying too far may undermine the concurrent gameplay experience in some cases.

In one embodiment, the computer game 150 may designate milestones in the game. The milestones may include a physical location in the game, a designated stage or level in the game, a designated point in a plot or story of the game, etc. For example, the computer game 150 may designate "completion of each level" as a milestone in the computer game 150. As shown in FIG. 4B, if Bob completes the current level, Bob is prompted to wait for Alice to complete the current level. Once Alice also completes the current level, the instances of the computer application 150 may advance both players to the next level. In the meantime—i.e., while Bob is waiting for Alice to complete the current level, the second instance $150_2$ of the computer game may present Bob an option to spectate (act as a spectator to) Alice—i.e., to view concurrent gameplay footage of Alice.

In one embodiment, if Bob chooses to spectate Alice, the second instance $150_2$ may output to Bob GUI screens as would be seen by Alice. That is, Bob may view the avatar $152_1$ of Alice as the avatar $152_1$ navigates the game environment as seen by Alice (and as output by the first instance $150_1$ of the computer game). To achieve this, the second instance $150_2$ of the computer game may receive concurrent gameplay footage frame-by-frame from the first instance $150_2$ of the computer game. Alternatively, the second instance $150_2$ may receive, from the first instance $150_1$, game state describing states of dynamic elements in the game environment provided by the first instance $150_1$ of the computer game. For example, the game state may describe what monsters were slain by Alice, what objectives were achieved by Alice, what items were acquired by Alice, what secrets were unlocked by Alice, etc.

Still alternatively, the second instance $150_2$ of the computer game may receive, from the first instance $150_1$, an input history of Alice. For example, the second instance $150_2$ may quickly playback the input history (of Alice thus far for the current level) in a new instance of the current level—to recreate the state of the game environment as experienced by Alice. The second instance $150_2$ may then use current input by Alice (received from the first instance $150_1$) to control playback of the avatar $152_1$ of Alice as Alice completes the current level.

In one embodiment, the second instance $150_2$ of the computer game may allow Bob to spectate Alice at any time during the computer game—and not merely upon completing a level. In one embodiment, Alice and/or Bob may specify, prior to launching a concurrent game, whether a player is allowed to spectate another player upon completing a level—or at all.

In one embodiment, if Alice and/or Bob does not wish for Bob to wait for Alice to complete the current level, Alice and/or Bob may request the computer game 150 to allow Bob to advance to the next level, despite Alice not having completed the current level. In one embodiment, Alice and/or Bob may specify, prior to launching a concurrent game, whether a player is allowed to advance to the next level despite the other player not having completed the current level.

In one embodiment, rather than the milestones being designated by the application (e.g., by a game developer), Alice and/or Bob may alter and/or designate the milestones in the game. As described above, milestones refer to points in the game at which a player is prompted (or required) to wait for another player to reach, as a prerequisite to being allowed to advance in the game. For example, Alice and/or Bob may specify the milestones in a menu screen provided by the computer game 150.

In other embodiments, a milestone may also be triggered based on a predefined condition. The condition may include a threshold relative distance (or relative progress) being exceeded between the avatars of Alice and Bob (e.g., measured in pixels, blocks, screens, levels, stages, etc.). For example, the second instance $150_2$ of the computer game 150 may disallow Bob to progress more than ten screens ahead of Alice in the computer game 150. As such, the second instance $150_2$ of the computer game may enforce a maximum relative progress (e.g., a single level in the computer game) between Bob and Alice.

In one embodiment, Bob may also request to obtain a glimpse into the game environment of Alice, based on the current location of the avatar $152_2$ of Bob. In response, the second instance $150_2$ of the computer game may receive state information from the first instance $150_1$, sufficient to output the corresponding portion of the game environment of Alice, based on the current location of the avatar $152_2$ of Bob. Further, Alice and/or Bob may configure—prior to or during concurrent gameplay—whether a player is allowed to glimpse into the game environment of another player based on the current location of the player.

In some cases, Bob may desire to annotate the game environment of Alice, e.g., to provide a game hint or tip. For example, suppose that Bob is concerned that Alice may not have seen Bob enter the hidden passage in FIG. 3B (perhaps Alice was momentarily not paying attention to or away from the game at the time). In one embodiment, Bob may instruct the second instance $150_2$ of the computer game to send an annotation 212 to the first instance $150_1$ of the computer game. For example, before entering the hidden passage in FIG. 3B, Bob may annotate the location of the hidden passage to ensure that Alice is notified of the hidden passage. In response, the first instance 150 of the computer game may overlay the game environment with the annotation 212.

In an alternative embodiment, Bob may annotate the hidden passage subsequent to completing the level and while waiting for Alice to complete the level. In still other embodiments, Bob may annotate the hidden passage while spectating Alice. In such cases, the computer application 150 may provide an interface for specifying an annotation. For example, the interface may allow Bob to specify text for the annotation, designate a position for the annotation in the game environment, specify other characteristics of the annotation (shape, design, color, time duration for the annotation to be displayed, etc.). The position for the annotation may default to the current position of the avatar $152_2$ of Bob. In alternative embodiments, the interface may also allow Bob and Alice to participate in a text chat and/or to initiate a voice chat, to provide an even richer concurrent gaming experience of the single-player mode of the computer game.

Figure 5:
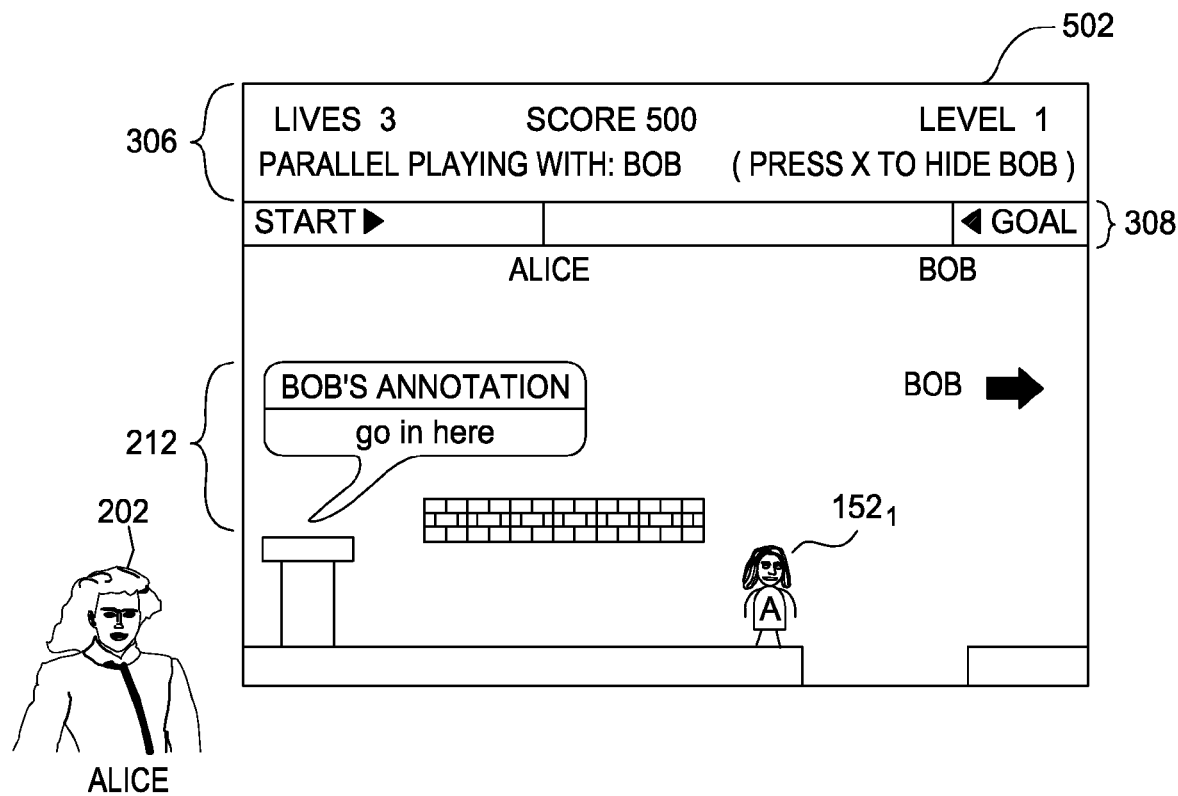
FIG. 5 illustrates an additional exemplary GUI screen as seen by the first player of the computer game, according to one embodiment of the invention.

FIG. 5 illustrates an exemplary GUI screen 502 as seen by Alice 202, according to one embodiment of the invention. As shown, the GUI screen 502 includes the annotation 212. Accordingly, Alice is notified that Bob annotated the pipe in the game environment with the text "go in here". Consequently, Alice is alerted to the location of the shortcut taken by Bob to complete the current level. In an alternative embodiment, an annotation may be drawn or engraved in the game environment rather than overlaid over the GUI screen. For example, Bob may draw, graffiti, or engrave an annotation on a wall, on snow, or on sand (e.g., in a 3D environment). Further, in one embodiment, Alice may select whether annotations are displayed in the game environment. Further, prior to launching a concurrent game, Alice and/or Bob may specify whether (and/or under what conditions) a player is allowed to annotate the game environment of another player.

Figure 6:
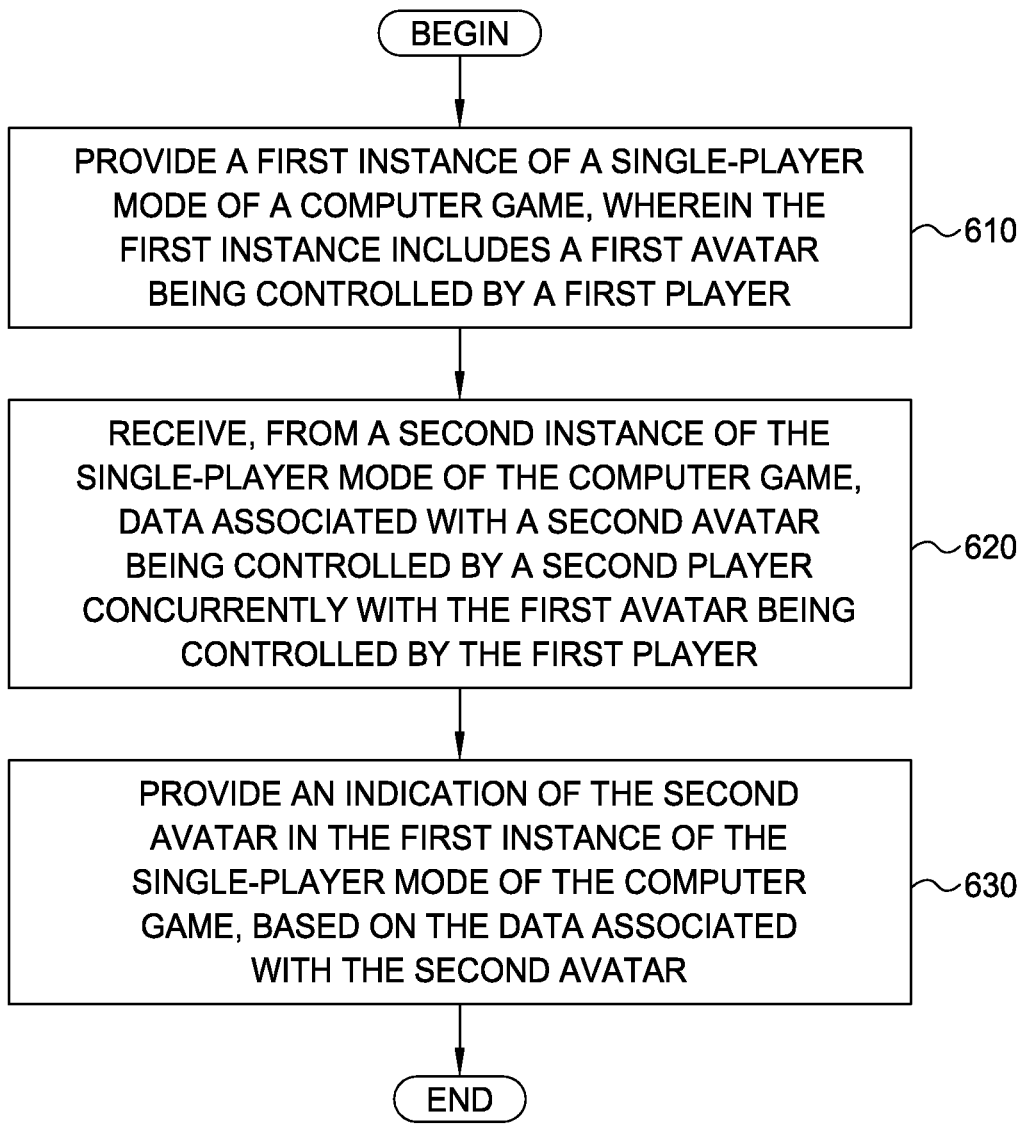
FIG. 6 is a flowchart depicting a method for providing the multi-session gaming experience of the single-player mode of the computer game, according to one embodiment of the invention.

FIG. 6 is a flowchart depicting a method 600 for providing a multi-session gaming experience of the single-player mode of the computer game 150 of FIG. 1, according to one embodiment of the invention. As shown, the method 600 begins at step 610, where the computer game 150 provides a first instance of the single-player mode of the computer game 150. The first instance includes a first avatar controlled by a first player. At step 620, the first instance receives, from a second instance of the single-player mode of the computer game 150, data associated with a second avatar that is controlled by a second player concurrently with the first avatar being controlled by the first player. For example, the first instance may receive the avatar data 206 of FIG. 2A, which specifies at least a current position of the second avatar.

At step 630, the first instance provides an indication of the second avatar in the first instance of the single-player mode of the computer game, based on the received data associated with the second avatar. For example, the first instance may output the non-interactive avatar 208 of FIG. 3B, based on the received avatar data 206. After the step 630, the method 600 terminates.

Figure 7:
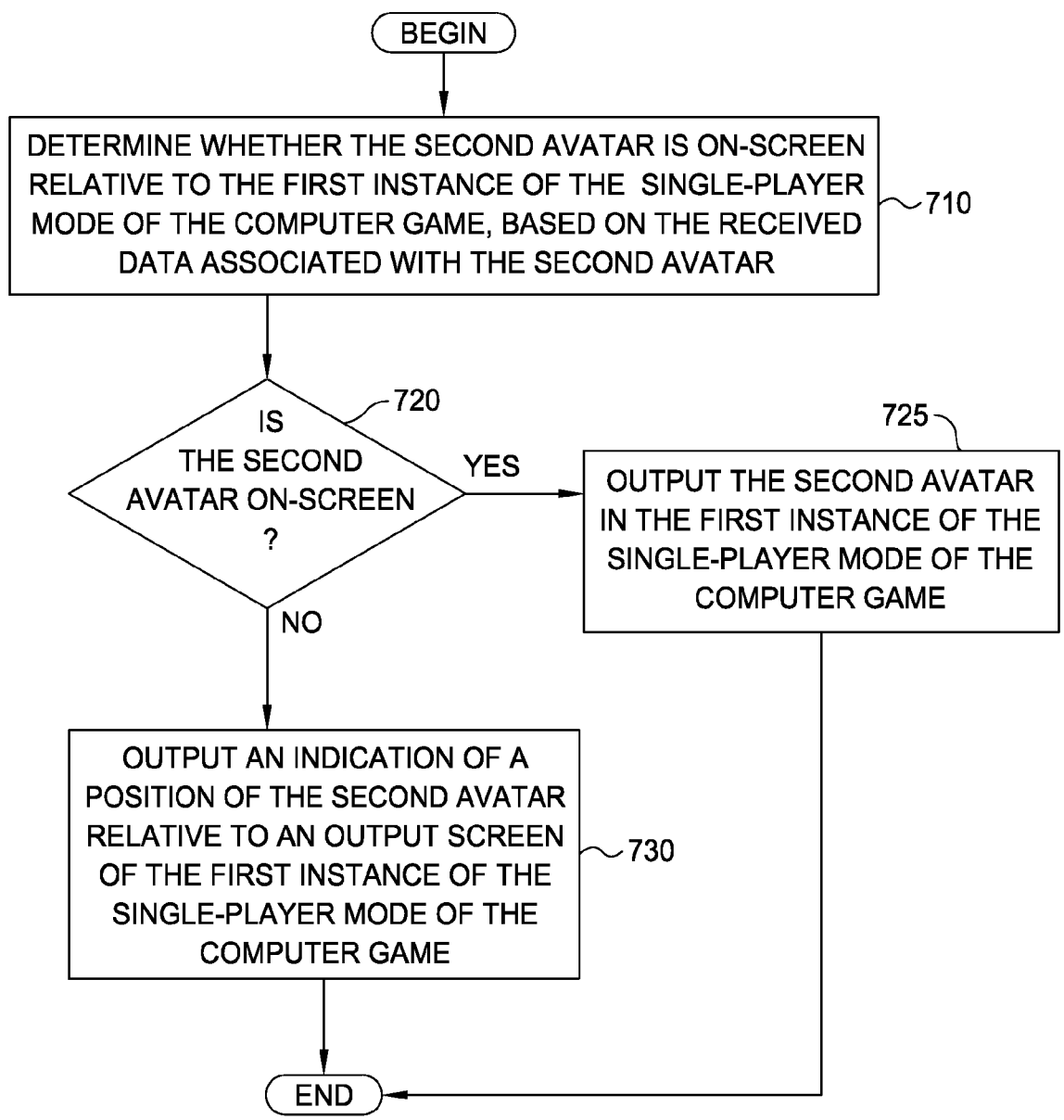
FIG. 7 is a flowchart depicting a method for conveying, to the first player, a location of an avatar of the second player, according to one embodiment of the invention.

FIG. 7 is a flowchart depicting a method 700 for conveying a location of the second avatar to the first player, according to one embodiment of the invention. As shown, the method 700 begins at step 710, where the first instance of the single-player mode of the computer game 150 determines whether the second avatar is on-screen relative to the first instance, based on the received data associated with the second avatar. At step 720, the first instance queries whether the determination is an affirmative or a negative one. If the second avatar is on-screen, the first instance outputs the second avatar (step 725). For example, the first instance outputs the non-interactive avatar 208 in FIG. 3B. Otherwise, the first instance outputs an indication of the position of the second avatar, relative to the output screen. For example, the first instance outputs the indication 310 in FIG. 3A. The indication 310 conveys a position of the non-interactive avatar 208, relative to the GUI screen 302. After the step 725 or the step 730, the method 700 terminates.

Figure 8:
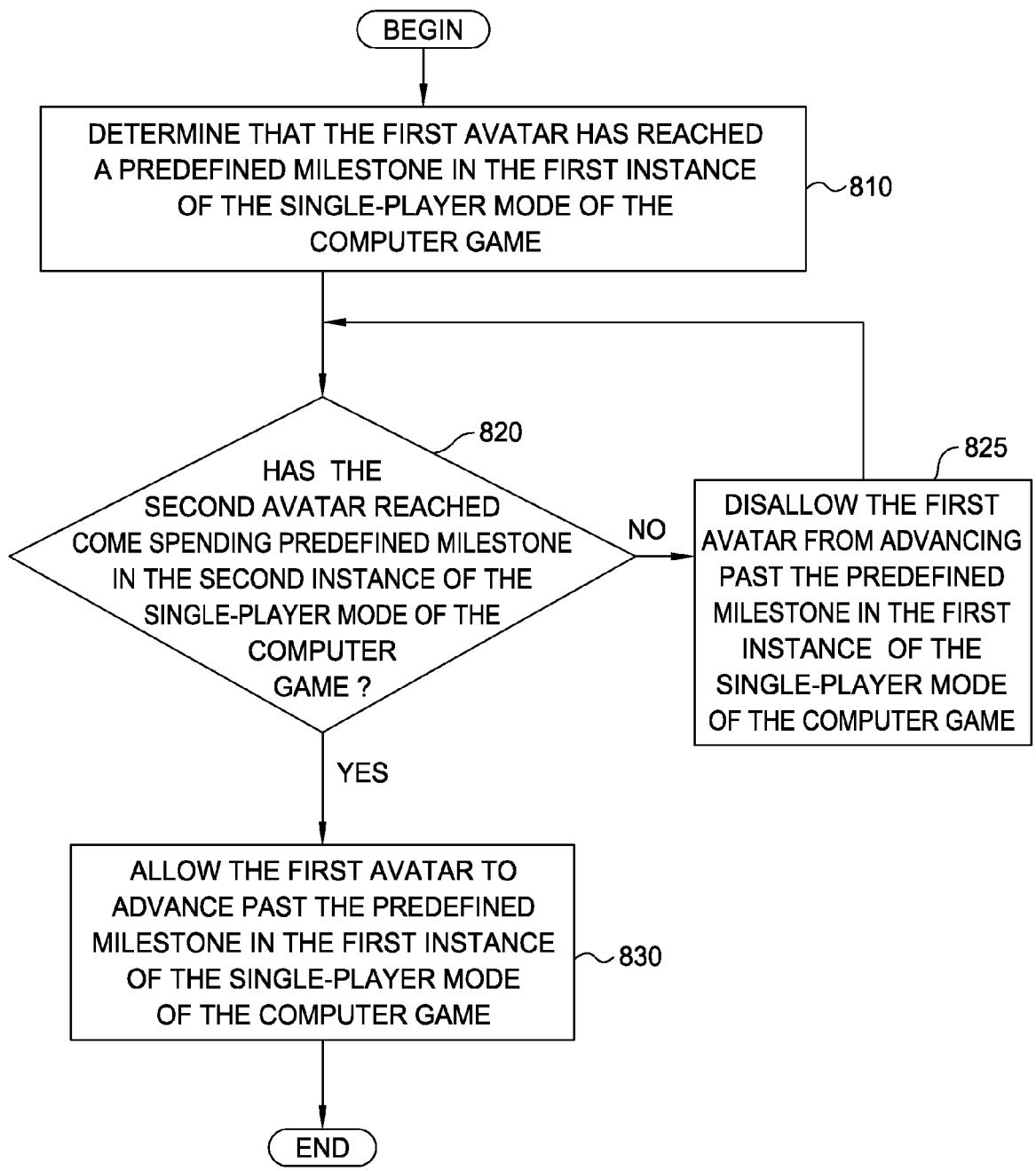
FIG. 8 is a flowchart depicting a method for determining whether to advance an avatar beyond a milestone in the computer game, according to one embodiment of the invention.

FIG. 8 is a flowchart depicting a method 800 for determining whether to advance an avatar beyond a milestone in the computer game, according to one embodiment of the invention. As shown, the method 800 begins at step 810, where the first instance of the single-player mode of the computer game determines that the first avatar has reached a predefined milestone. For example, the first avatar may have completed the current level. At step 820, the first instance determines whether the second avatar has reached a corresponding predefined milestone in the second instance of the single-player mode of the computer game. The first instance may use the avatar data 206 (and/or messages from the second instance indicating completion of a milestone) to make this determination.

In one embodiment, if the second avatar has not reached the milestone, the first instance disallows the first avatar from advancing past the predefined milestone (step 825). For example, the first instance may prompt the first player to wait for the second player and provide the first player an option to spectate the second player. The first instance may then return to step 820 to poll whether the second avatar has reached the predefined milestone.

In one embodiment, if the second avatar has reached the milestone, the first instance allows the first avatar to advance past the predefined milestone (step 830). At this point, the second instance may also allow the second avatar to advance past the predefined milestone, allowing both players to resume concurrent gameplay of the single-player mode of the computer game. After the step 830, the method 800 terminates.

While embodiments herein have been described with reference to an instance of a single-player mode of a game in which a player controls an avatar, other embodiments are broadly contemplated. For example, in one embodiment, the single-player mode of the computer game does not include any avatar controlled by the player, but includes an indication of game progress for the player. For instance, games of the puzzle genre may include an indication of a level or score of the player. Using the techniques disclosed herein, a first instance of the single-player mode of the computer game may convey, to a first user playing the first instance, a concurrent activity and/or progress of a second user playing a second instance of the single-player mode of the computer game. For example, the first instance of the computer game may include an indication of a concurrent level and/or score of the second player. Depending on the embodiment, the progress of each player in the respective instance of the computer game may be encapsulated by a game object that is passed between the respective instances of the computer game. The game object may identify the instance (and/or player) of the computer game, a current score or rank of the player, a current level or stage of the computer game, etc.

Advantageously, embodiments of the invention provide a multi-session gaming experience in a single-player mode of a computer game. In one embodiment, the computer game is configured to convey, to a first player of the computer game, progress of a second player who is playing a separate instance of the computer game. The computer game may output, to the first player, a non-interactive avatar that is controlled by the second player. The computer game may also output, to the first player, annotations to the game environment, made by the second player. Advantageously, the first player and the second player may participate in concurrent gameplay of the single-player mode of the computer game.

While the foregoing is directed to embodiments of the present invention, other and further embodiments of the invention may be devised without departing from the basic scope thereof, and the scope thereof is determined by the claims that follow.

What is claimed is:

1. A computer-implemented method to convey concurrent locations of avatars in different instances of a single-player mode of a computer game, the computer-implemented method comprising:
   providing a first instance of the single-player mode of the computer game, wherein the first instance includes a first virtual environment including a first avatar being controlled by a first player;
   receiving, from a second instance of the single-player mode of the computer game, data associated with a second avatar in a second virtual environment and being controlled by a second player concurrently with the first avatar being controlled by the first player;
   configuring one or more computer processors to generate an indication of a concurrent location of the second avatar in the first instance of the single-player mode of the computer game, based on the data associated with the second avatar, whereby the concurrent location of the second avatar in the second instance is conveyed to the first player of the first instance, wherein actions of the second avatar affect the second virtual environment and do not affect the first virtual environment;
   enforcing a maximum progress differential between the first avatar in the first instance of the single-player mode of the computer game and the second avatar in the second instance of the single-player mode of the computer game, including precluding the first avatar from advancing past a specific point in the first instance of the single-player mode of the computer game until the second avatar is determined to have reached a corresponding point in the second instance of the single-player mode of the computer game; and
   responsive to a request from the second player, annotating a specified location with a specified annotation in the first instance of the single-player mode of the computer game, wherein the annotation is output to the first player.

2. The computer-implemented method of claim 1, wherein the data associated with the second avatar comprises at least one of a progress of the second avatar, an appearance of the second avatar, a size of the second avatar, a velocity of the second avatar, and an acceleration of the second avatar.

3. The computer-implemented method of claim 1, wherein the indication of the second avatar conveys, to the first player and via the first instance of the single-player mode of the computer game, a position of the second avatar in the second instance of the single-player mode of the computer game.

4. The computer-implemented method of claim 1, wherein the first avatar cannot interact with the second instance of the single-player mode of the computer game, wherein the second avatar cannot interact with the first instance of the single-player mode of the computer game, and wherein actions of the first avatar affect the first virtual environment and do not affect the second virtual environment.

5. The computer-implemented method of claim 1, wherein the indication of the second avatar in the first instance of the single-player mode of the computer game comprises a directional indication characterizing a position of the second avatar relative to a displayed portion of the first instance of the single-player mode of the computer game, upon determining that the second avatar is off-screen relative to the first instance of the single-player mode of the computer game.

6. The computer-implemented method of claim 1, wherein precluding the first avatar from advancing past the specific point comprises:
   outputting, for display to the first player, concurrent gameplay footage of the second player from the second instance of the single-player mode of the computer game.

7. A non-transitory computer-readable medium containing a program which, when executed, performs an operation to convey concurrent locations of avatars in different instances of a single-player mode of a computer game, the operation comprising:
   providing a first instance of the single-player mode of the computer game, wherein the first instance includes a first virtual environment including a first avatar being controlled by a first player;
   receiving, from a second instance of the single-player mode of the computer game, data associated with a second avatar in a second virtual environment and being controlled by a second player concurrently with the first avatar being controlled by the first player;
   generating an indication of a concurrent location of the second avatar in the first instance of the single-player mode of the computer game, based on the data associated with the second avatar and by operation of one or more computer processors when executing the program, whereby the concurrent location of the second avatar in the second instance is conveyed to the first player of the first instance, wherein actions of the second avatar affect the second virtual environment and do not affect the first virtual environment;
   enforcing a maximum progress differential between the first avatar in the first instance of the single-player mode of the computer game and the second avatar in the second instance of the single-player mode of the computer game, including precluding the first avatar from advancing past a specific point in the first instance of the single-player mode of the computer game until the second avatar is determined to have reached a corresponding point in the second instance of the single-player mode of the computer game; and
   responsive to a request from the second player, annotating a specified location with a specified annotation in the first instance of the single-player mode of the computer game, wherein the annotation is output to the first player.

8. The non-transitory computer-readable medium of claim 7, wherein the data associated with the second avatar comprises at least one of a progress of the second avatar, an appearance of the second avatar, a size of the second avatar, a velocity of the second avatar, and an acceleration of the second avatar.

9. The non-transitory computer-readable medium of claim 7, wherein the indication of the second avatar conveys, to the first player and via the first instance of the single-player mode of the computer game, a position of the second avatar in the second instance of the single-player mode of the computer game.

10. The non-transitory computer-readable medium of claim 7, wherein the first avatar cannot interact with the second instance of the single-player mode of the computer game, wherein the second avatar cannot interact with the first instance of the single-player mode of the computer game, and wherein actions of the first avatar affect the first virtual environment and do not affect the second virtual environment.

11. The non-transitory computer-readable medium of claim 7, wherein the indication of the second avatar in the first instance of the single-player mode of the computer game comprises a directional indication characterizing a position of the second avatar relative to a displayed portion of the first instance of the single-player mode of the computer game, upon determining that the second avatar is off-screen relative to the first instance of the single-player mode of the computer game.

12. The non-transitory computer-readable medium of claim 7, wherein precluding the first avatar from advancing past the specific point comprises:
   outputting, for display to the first player, concurrent gameplay footage of the second player from the second instance of the single-player mode of the computer game.

13. A system to convey concurrent locations of avatars in different instances of a single-player mode of a computer game, the system comprising:
   one or more computer processors; and
   a memory containing a program, which when executed by the one or more computer processors is configured to perform an operation comprising:
      providing a first instance of the single-player mode of the computer game, wherein the first instance includes a first virtual environment including a first avatar being controlled by a first player;
      receiving, from a second instance of the single-player mode of the computer game, data associated with a second avatar in a second virtual environment and being controlled by a second player concurrently with the first avatar being controlled by the first player;
      generating an indication of a concurrent location of the second avatar in the first instance of the single-player mode of the computer game, based on the data associated with the second avatar, whereby the concurrent location of the second avatar in the second instance is conveyed to the first player of the first instance, wherein actions of the second avatar affect the second virtual environment and do not affect the first virtual environment;
      enforcing a maximum progress differential between the first avatar in the first instance of the single-player mode of the computer game and the second avatar in the second instance of the single-player mode of the computer game, including precluding the first avatar from advancing past a specific point in the first instance of the single-player mode of the computer game until the second avatar is determined to have reached a corresponding point in the second instance of the single-player mode of the computer game; and
      responsive to a request from the second player, annotating a specified location with a specified annotation in the first instance of the single-player mode of the computer game, wherein the annotation is output to the first player.

14. The system of claim 13, wherein the data associated with the second avatar comprises at least one of a progress of the second avatar, an appearance of the second avatar, a size of the second avatar, a velocity of the second avatar, and an acceleration of the second avatar.

15. The system of claim 13, wherein the indication of the second avatar conveys, to the first player and via the first instance of the single-player mode of the computer game, a position of the second avatar in the second instance of the single-player mode of the computer game.

16. The system of claim 13, wherein the first avatar cannot interact with the second instance of the single-player mode of the computer game, wherein the second avatar cannot interact with the first instance of the single-player mode of the computer game, and wherein actions of the first avatar affect the first virtual environment and do not affect the second virtual environment.

17. The system of claim 13, wherein the indication of the second avatar in the first instance of the single-player mode of the computer game comprises a directional indication characterizing a position of the second avatar relative to a displayed portion of the first instance of the single-player mode of the computer game, upon determining that the second avatar is off-screen relative to the first instance of the single-player mode of the computer game.

18. The system of claim 13, wherein precluding the first avatar from advancing past the specific point comprises:
outputting, for display to the first player, concurrent gameplay footage of the second player from the second instance of the single-player mode of the computer game.

19. The computer-implemented method of claim 1, wherein each instance represents a separate execution of the computer game that includes a game state specific to respective separate execution, wherein each instance corresponds to a parallel universe of the computer game, the parallel universe of the respective instance including the avatar of the respective instance and a non-interactive instantiation of the avatar of the other instance, wherein the non-interactive instantiation of the avatar of the other instance serves to provide a glimpse into the parallel universe of the other instance of the computer game.

20. The computer-implemented method of claim 19, wherein the indication of the second avatar in the first instance of the single-player mode of the computer game comprises a directional indication characterizing a position of the second avatar relative to a displayed portion of the first instance of the single-player mode of the computer game, upon determining that the second avatar is off-screen relative to the first instance of the single-player mode of the computer game;
wherein the first instance of the computer game is configured to convey to the first player a concurrent progress of the second player relative to the first player in the computer game, apart from the generated indication, to facilitate providing a concurrent single-player experience of the computer game.

21. The computer-implemented method of claim 20, wherein generating the indication of the concurrent location of the second avatar in the first instance of the single-player mode of the computer game comprises:
upon determining that the second avatar is off-screen relative to a concurrent output screen of the first instance of the single-player mode of the computer game, generating a directional indicator in the concurrent output screen, the directional indicator representing a direction, relative to the output screen, that the second avatar is located in the second instance, wherein the directional indicator is not disposed at the concurrent location of the second avatar.

22. The computer-implemented method of claim 21, wherein generating the indication of the concurrent location of the second avatar in the first instance of the single-player mode of the computer game further comprises:
upon determining that the second avatar is on-screen relative to the first instance of the single-player mode of the computer game, generating an avatar indicator in the concurrent output screen, the avatar indicator being disposed at the concurrent location of the second avatar, wherein the avatar indicator is visually distinct from the second avatar to convey to the first player that actions reflected by the avatar indicator do not affect the first virtual environment.

23. The computer-implemented method of claim 22, wherein precluding the first avatar from advancing past the specific point includes suspending play of the first avatar while conveying, to the first player, the concurrent progress of the second player relative to the first player in the computer game, apart from the generated indication.

24. The computer-implemented method of claim 23, wherein conveying, to the first player, the concurrent progress of the second player comprises outputting, for display to the first player, concurrent gameplay footage of the second player from the second instance of the single-player mode of the computer game, wherein play of the first avatar is allowed to resume only upon determining that the second avatar has reached the corresponding point in the second instance of the single-player mode of the computer game, wherein the computer-implemented method further comprises:
receiving the request from the second instance of the single-player mode of the computer game, wherein the request specifies to annotate the first instance of the single-player mode of the computer game, wherein the request further specifies: (i) the annotation, that is desired by the second player and (ii) the location, that is desired by the second player and independent of the concurrent location of the second avatar, to annotate within the first virtual environment; wherein the annotation is different from the indication and is not an avatar.

25. The computer-implemented method of claim 24, wherein the annotation includes a message from the second player to the first player, wherein the generated indication conveys, to the first player and via the first instance of the single-player mode of the computer game, the concurrent location of the second avatar in the second instance of the single-player mode of the computer game.

26. The computer-implemented method of claim 25, wherein the data associated with the second avatar specifies, in respective instances, each of: (i) a progress of the second avatar; (ii) an appearance of the second avatar; (iii) a size of the second avatar; (iv) a location of the second avatar; (v) a velocity of the second avatar; and (vi) an acceleration of the second avatar.

27. The computer-implemented method of claim 26, wherein the first avatar does not interact with the second instance of the single-player mode of the computer game, wherein the second avatar does not interact with the first instance of the single-player mode of the computer game;
wherein the indication of the second avatar in the first instance of the single-player mode of the computer game comprises, in respective instances, each of a visual indication and an aural indication, and wherein actions of the first avatar affect the first virtual environment and do not affect the second virtual environment.

* * * * *